United States Patent Office 3,375,239
Patented Mar. 26, 1968

3,375,239
POLYMERIZATION OF 1,3-BUTADIENE USING AN ORGANOMETAL AS FIRST COMPONENT, A SECOND COMPONENT COMPRISED OF TITANIUM AND IODINE WITH A GROUP IV–B METAL HALIDE CATALYST ADJUVANT
William J. Trepka and Carl A. Uraneck, Bartlesville, Okla., assignors to Phillips Petroleum Company, a corporation of Delaware
No Drawing. Filed Dec. 18, 1964, Ser. No. 419,554
6 Claims. (Cl. 260—94.3)

ABSTRACT OF THE DISCLOSURE

High cis-polybutadiene is made by contacting 1,3-butadiene with the catalyst which forms on mixing as a first component an organometal compound and a second component containing titanium and iodine with a Group IV–B metal halide catalyst adjuvant.

This invention relates to a method of polymerizing 1,3-butadiene. In another aspect it relates to a method of improving the polymerization rate of 1,3-butadiene in the presence of an organometallic catalyst system.

Polybutadiene which contains at least 85 percent of the monomer units joined by cis-1,4-addition exhibits outstanding physical properties which make it very valuable for use in treadstock for automobile and truck tires. Butadiene polymers which are very high in cis content can be made using a catalyst system which is formed by mixing an organometal compound, such as triethylaluminum, with a second component containing titanium and iodine, such as titanium tetraiodide, titanium tetrachloride and titanium tetraiodide, or titanium tetrachloride and elemental iodine. Normally, the rate of polymerization or, in other words, the degree of conversion of monomer to polymer within a given length of time, can be increased by increasing the polymerization temperature. This, however, carries with it the disadvantage of lowering the cis content of the polymer. It is highly desirable to be able to increase the polymer conversion in these systems without decreasing the cis-1,4 configuration.

According to the present invention it has now been discovered that in the polymerization of butadiene in the presence of a catalyst system formed by mixing as a first component an organometal compound and a second component containing titanium and iodine, said catalyst system being capable of polymerizing the butadiene to a polymer having high cis-1,4 configuration, the conversion or rate of polymerization can be substantially increased by adding to the polymerization system, preferably after polymerization has been initiated, an adjuvant which is a halide of silicon, germanium, tin or lead. These metals will be referred to hereinafter as the Group IV–B metals as shown in the Periodic Chart of the Atoms designed by Henry B. Hubbard and revised by William F. Meggers in 1956, published by W. M. Welch Manufacturing Company in Chicago, Ill. The halide adjuvant can contain organic groups or be a tetrahalide of the metals named. The adjuvant must be added after polymerization has been initiated and polymerization must be continued for a period of time following addition of the adjuvant in order to enjoy the benefits of this invention.

It is an object of this invention to provide an improved method of polymerizing 1,3-butadiene. Another object is to provide a method of increasing the polymerization rate of 1,3-butadiene in the presence of an organometal catalyst system.

Another object is to increase the conversion of 1,3-butadiene to high cis polymer using the catalyst system formed by mixing an organometal and a second component containing titanium and iodine.

Other objects, advantages and features of this invention will be apparent to those skilled in the art from the following discussion.

The halide adjuvant which is employed in the method of this invention can be represented by the formula $R_nMX_m$ wherein M is a Group IV–B metal, X is halogen, namely fluorine, bromine, chlorine and iodine, R is a hydrocarbon radical having 1 to 12 carbon atoms, and selected from saturated aliphatic, saturated cycloaliphatic and aromatic radicals, $n$ is an integer of 0 to 3, $m$ is an integer of 1 to 4 and $m+n$ equals 4. If R is a tertiary aliphatic or aromatic radical, then it is preferred that $n$ be not greater than 2. It is intended that the terms "aliphatic," "cycloaliphatic," and "aromatic" include hydrocarbon radicals which are combinations of groups such as alkaryl, aralkyl, alkylcycloalkyl, and the like.

It is preferred that the adjuvant be a tetrahalide of one of the Group IV–B metals, and most preferably a tetrachloride, since these compounds exhibit the greatest activity and are most effective in promoting the increases in conversion which can be obtained through the procedures described. Examples of compounds which correspond to the above formula for the adjuvant include silicon tetrachloride, stannic chloride, germanium tetrachloride, lead tetrachloride, silicon tetrafluoride, tin tetrabromide, lead tetraiodide, dichlorodiphenylsilane, bromotriethylsilane, 1-naphthyltrichlorosilane, dichlorodi-2-naphthylsilane, n-dodecyltrifluorosilane, cyclohexylmethyldiiodosilane, 3,3-dimethylhexyltrichlorosilane, dibenzyldibromosilane, trichloromethylgermane, dibromodi-n-octylgermane, difluoromethylcyclopentylgermane, trichloro-tert-butylgermane, trichloromethyltin, dichlorodiethyltin, tribromobenzyltin, diiododi-4-tolyltin, trichloro-4-methylcyclohexyltin, dichlorodi-n-dodecyltin, trichloro-1-naphthyltin, bromotrimethyllead, dibromodiisopropyllead, trichloro-tert-butyllead, trichlorophenyllead, dichlorodi-n-decyllead, and the like.

The catalyst systems which can be promoted according to the present invention are those which are known to polymerize 1,3-butadiene to form a polymer having high cis-1,4-configuration, preferably 85 percent or greater cis content. These catalyst systems can be described broadly as being formed by mixing a first component which is an organometal compound plus a second component which contains titanium and iodine. Preferably the titanium is added as a halide. The second component can be a single compound such as titanium tetraiodide or multiple materials, such as titanium tetrachloride and free iodine.

It is usually preferred to employ a catalyst which is selected from the group consisting of (1) a catalyst formed by mixing materials comprising an organometal compound having the formula $R'_mM'$, wherein R' is an alkyl, cycloalkyl, aryl, alkaryl, aralkyl, alkylcycloalkyl, cycloalkylalkyl, arylcycloalkyl or cycloalkylaryl radical, M' is aluminum, mercury, zinc, beryllium, cadmium, magnesium, sodium or potassium, and $m$ is equal to the valence of the metal M', and titanium tetraiodide, (2) a catalyst formed by mixing materials comprising an organometal compound having the formula $R'_nM''$, wherein R' is an organo radical as defined above, M'' is aluminum, magnesium, lead, sodium or potassium, and $n$ is equal to the valence of the metal M'', titanium tetrachloride and titanium tetraiodide, (3) a catalyst formed by mixing materials comprising an organometal compound having the formula $R'_aM'''$, wherein R is an organo radical as defined above, M''' is aluminum or magnesium and $a$ is equal to the valence of the metal M''', a compound having the formula $TiX_b$, wherein X is chlorine or bromine and $b$ is an integer from 2 to 4, inclusive, and elemental iodine, or an organic iodide, (4) a catalyst formed by mixing materials comprising an organometal compound having the formula $R'_xM^{iv}$, wherein $R'$ is an organo radical as defined above, $M^{iv}$ is aluminum, gallium, indium or thallium, and $x$ is equal to the valence of the metal $M^{iv}$, a titanium halide having the formula $TiX_4$, wherein X is chlorine or bromine, and an inorganic halide having the formula $M^vI_c$, wherein $M^v$ is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst formed by mixing materials comprising an organo compound having the formula $R'_xM^{iv}$, wherein $R'$, $M^{iv}$ and $x$ are as defined above, titanium tetraiodide, and an inorganic halide having the formula $M^{vi}X_d$, wherein $M^{vi}$ is aluminum, gallium, indium, thallium, germanium, tin, lead, phosphorus, antimony, arsenic or bismuth, X is chlorine or bromine, and $d$ is an integer from 2 to 5, inclusive. The $R'$ radicals of the aforementioned formulas preferably contain up to and including 20 carbon atoms.

The following are examples of preferred catalyst systems which can be used to polymerize 1,3-butadiene to a cis 1,4-polybutadiene: triisobutyl aluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl)aluminum and titanium tetraiodide; tetraethyllead, titanium tetrachloride and titanium tetraiodide; trimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride and phosphorus triiodide; tri-n-dodecylaluminum, titanium tetrachloride, and tin tetraiodide; triethylgallium, titanium tetrabromide, and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; triisobutylaluminum, titanium tetrachloride, and 1,4-diiodo-2-butene; and tribenzylaluminum, titanium tetraiodide, and germanium tetrachloride.

The polymerization process for preparing cis-polybutadiene is generally carried out in the presence of a hydrocarbon diluent which is not deleterious to the catalyst system. Examples of suitable diluents include aromatic, paraffinic and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst employed in polymerizing 1,3-butadiene to a cis-polybutadiene can vary over a rather wide range. The amount of the organometal used in forming the catalyst composition is usually in the range of 0.75 to 20 mols per mol of the halogen-containing component, i.e., a metal halide with or without a second metal halide or elemental iodine. The mol ratio actually used in a polymerization will depend upon the particular components employed in the catalyst system. However, a preferred mol ratio is generally from 1:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However higher pressures can be employed if desired, these pressures being obtained by some such suitable method as the pressurization of the reactor with a gas which is inert with respect to the polymerization reaction.

Various materials are known to be detrimental to the catalyst employed in preparing the conjugated diene polymers. The materials include carbon dioxide, oxygen and water. It is usually desirable, therefore, that the monomer and diluent be freed of these materials as well as other materials that may tend to inactivate the catalyst. Furthermore, it is desirable to remove air and moisture from the reaction vessel in which the polymerization is to be conducted.

The amount of the halide adjuvant which is employed is generally in the range of 0.002 to 1 gram mol of the adjuvant per gram atom of titanium in the catalyst system, preferably from 0.005 to 0.5 gram mol of a halide adjuvant per gram atom of titanium. In order to obtain maximum benefit as a polymerization promoter, it is preferred that the adjuvant be introduced into the system after polymerization has been initiated. The adjuvant is generally introduced after the conversion of monomer has reached at least 5 percent and preferably after conversion is about 10 percent or more. The adjuvant can be added in one or more increments spaced as desired or introduced continuously throughout the major portion of the polymerization period. It is preferred that all the adjuvant be introduced by the time the monomer conversion has reached 95 percent and preferably by the time the conversion has reached 85 percent. While the maximum benefits in increased polymerization rates are achieved by adding all or a major portion of the halide adjuvant during the early stages of polymerization, the polymerization rate can be controlled to a considerable extent by the amount of adjuvant added as well as by the time of its injection into the system.

Upon completion of the polymerization reaction, the polymerization mixture is treated to inactivate the catalyst and the polymer is recovered. A convenient method for polymer recovery involves steam stripping the diluent from the polymer. In another suitable method, a catalyst inactivating material such as an alcohol is added to the polymerization mixture to inactivate the catalyst and precipitate the polymer. The polymer is then separated from the alcohol and diluent by means such as decantation or filtration. It has been found advantageous to add an antioxidant, such as 4,4'-methylene-bis-(2,6-di-tert-butyl phenol), to the polymer solution prior to recovering the polymer.

A better understanding of the invention can be obtained by referring to the following examples which are typical only and should not be construed to limit the invention unduly.

EXAMPLE I 1,3-butadiene was polymerized in the presence of a catalyst system formed on mixing triisobutylaluminum, iodine, and titanium tetrachloride. A series of runs was made in which variable amounts of stannic chloride were added two hours after the start of the polymerization. The following recipe was used:

| | |
|---|---|
| 1,3-butadiene, parts by weight | 100 |
| Toluene, parts by weight | 1000 |
| Triisobutylaluminum (TBA), mhm [1] | 2.6 |
| Iodine, mhm | 0.8 |
| Titanium tetrachloride, mhm | 0.4 |
| Time, hours | 2+0.25 |
| Temperature, °F. | 41 |

[1] "mhm" is an abbreviation for millimols per 100 parts by weight of monomer, e.g., gram millimols per 100 grams of monomer.

Toluene was charged first after which the reactor was purged with nitrogen. Butadiene was added followed by the triisobutylaluminum, iodine, and titanium tetrachloride, in the order named. After polymerization had been allowed to proceed for two hours, variable amounts of stannic chloride were added, and polymerization was continued fifteen more minutes. One run was made in the absence of stannic chloride. All mixtures were agitated throughout the polymerization period. The reactions were shortstopped with a solution of 2,2-methylene-bis(4-methyl-6-tert-butylphenol) in isopropyl alcohol, the amount used being sufficient to provide one part by weight of antioxidant per 100 parts by weight rubber. The polymers were coagulated in isopropyl alcohol, separated, and dried. Results obtained in the several runs are reported in Table I.

TABLE I

| Run No. | SnCl₄, mhm | SnCl₄/TiCl₄ Mole Ratio | Conversion, Percent | Increase in Conversion, Percent | Inherent Viscosity | Gel, Percent | ML-4 at 212° F. | Cold Flow, mg./min. |
|---|---|---|---|---|---|---|---|---|
| 1 | 0 | | 76.3 | | 2.48 | 0 | 44 | 8.47 |
| 2 | 0.025 | 0.06/1 | 85.5 | 12.1 | 2.64 | 0 | 52.5 | 4.85 |
| 3 | 0.05 | 0.125/1 | 86.5 | 13.4 | 2.62 | 0 | 48.5 | 4.56 |
| 4 | 0.10 | 0.25/1 | 85.3 | 11.8 | 2.65 | 0 | 51.5 | 4.08 |
| 5 | 0.15 | 0.375/1 | 84.8 | 11.1 | 2.58 | 0 | 46 | 5.50 |
| 6 | 0.20 | 0.5/1 | 81.2 | 6.4 | 2.42 | 0 | 41.5 | 6.06 |

These data show that better conversion rates were obtained when stannic chloride was added after polymerization had started. The products from runs in which stannic chloride was used had lower cold flow than the control.

EXAMPLE II

The recipe of Example I was employed for the polymerization of butadiene except that the temperature was −25° C. (−13° F.) and the reaction time was varied. Two runs were made in which 0.05 mhm of stannic chloride was used and two were made in the absence of stannic chloride. Results are presented in Table II.

TABLE II

| SnCl₄, mhm | Polymerization Time, Hrs.[1] | Conversion, Percent | Increase in Conversion, Percent | Microstructure, Percent | | | Inherent Viscosity | Gel, Percent |
|---|---|---|---|---|---|---|---|---|
| | | | | Cis | Trans | Vinyl | | |
| 0 | 4.25+0 | 26.0 | | 96.6 | 1.1 | 2.3 | 2.17 | 0 |
| 0.05 | 2.75+1.5 | 34.0 | 30.8 | 96.6 | 1.1 | 2.3 | 2.07 | 0 |
| 0 | 5.75+0 | 34.2 | | 96.8 | 0.9 | 2.3 | 2.44 | 0 |
| 0.05 | 2.75+3.0 | 43.4 | 26.9 | 96.7 | 0.9 | 2.4 | 1.95 | 0 |

[1] Time of polymerization without SnCl₄ plus time of polymerization after SnCl₄ addition.

These data demonstrate the effectiveness of adding stannic chloride after polymerization had been initiated when the reactions were carried out at a low temperature.

EXAMPLE III

A series of runs was made using the recipe and polymerization temperature employed in Example I. Stannic chloride was used in four of the runs and silicon tetrachloride in a fifth, while two runs were made without additive. Time for introduction of the stannic chloride was varied. Results are presented in Table III.

TABLE III

| Run No. | Additive,[1] mhm | Polymerization Time, Hrs. | Conversion, Percent | Increase in Conversion | Microstructure, Percent | | | Inherent Viscosity | Gel, Percent | ML-4 at 212° F. |
|---|---|---|---|---|---|---|---|---|---|---|
| | | | | | Cis | Trans | Vinyl | | | |
| 1 | 0 | 2.0+0 | 74.6 | | 95.2 | 1.7 | 3.1 | 2.60 | 0 | 44.3 |
| 2 | 0.05 | 0.25+1.75 | 85.0 | 13.9 | 95.3 | 1.7 | 3.0 | 2.49 | 0 | 41.7 |
| 3 | 0.05 | 0.5+1.5 | 83.6 | 12.1 | 95.4 | 1.7 | 2.9 | 2.53 | 0 | 42.8 |
| 4 | 0.05 | 1.0+1.0 | 82.4 | 10.5 | 95.3 | 1.7 | 3.0 | 2.51 | 0 | 43.9 |
| 5 | 0.05 | 1.5+0.5 | 81.0 | 8.6 | 95.7 | 1.4 | 2.9 | 2.48 | 0 | 42.2 |
| 6 | 0 | 3.0+0 | 83.5 | | | | | | | 55.5 |
| 7 | 0.05 | 0.25+2.75 | 90.8 | 8.7 | | | | | | 61 |

[1] SnCl₄ added in runs 2, 3, 4, 5; SiCl₄ added in run 7.

These data show that silicon tetrachloride increased polymerization rate when added after the start of the reaction. The data also show that after polymerization has been initiated, the time of introduction of the promoter can be varied.

In the above examples, Mooney viscosity was determined by ASTM Method D-1646-61.

Cold flow was measured by extruding the rubber through a ¼-inch orifice at 3.5 p.s.i. pressure and a temperature of 50° C. (122° F.). After allowing 10 minutes to reach steady state, the rate of extrusion was measured and the values reported in milligrams per minute.

Inherent viscosity was determined as follows: One-tenth gram of polymer was placed in a wire cage made from 80 mesh screen and the cage was placed in 100 ml. of toluene contained in a wide-mouth, 4-ounce bottle. After standing at room temperature (approximately 77° F.) for 25 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-once bottle. A piece of folded quarter-inch hardware cloth in the bottom of the bottle supported the cage with minimum contact. The bottle containing the cage was weighed to the nearest 0.02 gram during a minimum 3-minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.

The microstructure of the polymers was determined by infrared analysis using a commercial infrared spectrometer. The polymers were dissolved in carbon disulfide to form solutions having 25 grams of polymer per liter of solution. The infrared spectrum of such a solution (percent transmission) is then determined in a commercial infrared spectrometer. The percent of the total unsaturation present as trans 1,4- is calculated according to the following equation and consistent units:

$$\epsilon = \frac{E}{tc}$$

where $\epsilon$=extinction coefficient (liter-mols$^{-1}$-centimeters$^{-1}$); E=extinction (log $I_o/I$); $t$=path length (centimeters); and $c$=concentration (mols double bond/liter). The extinction is determined at the 10.35 micron band and the extinction coefficient used is 146 (liters-mols$^{-1}$-centimeters$^{-1}$). The percent of the total unsaturation present as 1,2- (or vinyl) is calculated according to the above equation, using the 11.0 micron band and an extinction coefficient of 209 (liters-mols$^{-1}$-centimeters$^{-1}$). The percent of the total unsauration present as cis 1,4- is obtained by subtracting the trans 1,4- and 1,2-(vinyl) determined according to the above methods from the theoretical unsaturation assuming one double bond per each $C_4$ unit in the polymer.

As will be apparent to those skilled in the art, various modifications can be made in this invention without departing from the spirit or scope thereof.

We claim:
1. A process for polymerizing 1,3-butadiene which comprises contacting 1,3-butadiene with a catalyst which forms on mixing a first organometal component with a second component containing titanium and iodine, said catalyst being capable of polymerizing said butadiene to a polymer having a high cis-content, adding to the polymerization system after polymerization has commenced a halide adjuvant having the formula $R_nMX_m$ wherein M is a Group IV-B metal, X is halogen, R is selected from the group consisting of saturated aliphatic, saturated cycloaliphatic and aromatic radicals having 1 to 12 carbon atoms, $n$ is an integer of 0 to 3, $m$ is an integer of 1 to 4, and $n+m$ equals 4, and continuing the polymerization.

2. In a process for polymerizing 1,3-butadiene to form a polymer having a cis-content of at least 85 percent wherein said 1,3-butadiene is contacted in a polymerization mixture with a catalyst which forms on mixing an organometal compound as a first component and a second component containing titanium and iodine, the improvement which comprises, adding to the polymerization mixture after from 5 to 95 percent of the monomer has been converted to polymer from 0.002 to 1 mol per atom of titanium in the catalyst system of a halide adjuvant having the formula $R_nMX_m$ wherein M is a Group IV-B metal, X is halogen, R is selected from the group consisting of saturated aliphatic, saturated cycloaliphatic and aromatic radicals having 1 to 12 carbon atoms, $n$ is an integer of 0 to 3, $m$ is an integer of 1 to 4, and $n+m$ equals 4, and continuing the polymerization.

3. The process of claim 2 in which the adjuvant is added after from 10 to 85 percent of the butadiene has been converted to polymer.

4. The process of claim 2 wherein said catalyst is one which forms on mixing triisobutylaluminum, titanium tetrachloride, and iodine.

5. The process of claim 4 wherein said adjuvant is stannic chloride.

6. The process of claim 4 wherein said adjuvant is silicon tetrachloride.

References Cited

UNITED STATES PATENTS 3,278,508    10/1966    Kahle et al. _____ 260—94.3

JOSEPH L. SCHOFER, *Primary Examiner.*

R. A. GAITHER, *Assistant Examiner.*